(12) United States Patent
Doroftei

(10) Patent No.: US 6,213,487 B1
(45) Date of Patent: Apr. 10, 2001

(54) HELICAL DRIVE WHEELCHAIR

(75) Inventor: Mighel Doroftei, Calgary (CA)

(73) Assignee: 744353 Alberta Ltd., Calgary (CA)

( * ) Notice: Subject to any disclaimer, the term of this patent is extended or adjusted under 35 U.S.C. 154(b) by 0 days.

(21) Appl. No.: 08/897,618

(22) Filed: Jul. 21, 1997

Related U.S. Application Data

(63) Continuation-in-part of application No. 08/771,982, filed on Dec. 23, 1996.

(51) Int. Cl.[7] ........................................... B62M 1/04
(52) U.S. Cl. .................... 280/252; 280/250.1; 74/143
(58) Field of Search ................. 280/250.1, 244, 280/246, 247, 252; 74/143

(56) References Cited

U.S. PATENT DOCUMENTS

| | | | |
|---|---|---|---|
| Re. 33,058 | 9/1989 | Steuer et al. | 74/750 B |
| 51,815 | 1/1866 | Eads | 74/127 |
| 87,630 | 3/1869 | Burns | 200/252 |
| 381,160 | 4/1888 | Moon | 74/127 |
| 395,099 | 12/1888 | Willett | 74/127 |
| 398,899 | 3/1889 | Martignoni | 74/127 |
| 408,745 | 8/1889 | Pool | 74/127 |
| 443,347 | 12/1890 | Allen | 440/21 |
| 450,997 | 4/1891 | Dies | 74/127 |
| 465,099 | 12/1891 | Rice, Jr. | 74/127 |
| 465,100 | 12/1891 | Rice, Jr. | 74/127 |
| 549,397 | 11/1895 | Savorgnan | 280/253 |
| 552,910 | 1/1896 | Kimball | 74/127 |
| 555,242 | 2/1896 | Hallenbeck | 74/31 |
| 578,269 * | 3/1897 | Savorgnan | 74/54 |
| 579,218 | 3/1897 | Bremer et al. | 74/127 |
| 597,621 | 1/1898 | Russell | 74/127 |
| 617,762 | 1/1899 | McCollum | 74/127 |
| 618,330 | 1/1899 | Campbell | 74/127 |
| 622,780 * | 4/1899 | Olson et al. | 74/127 |
| 641,906 | 1/1900 | Trabue et al. | 43/20 |
| 651,244 | 6/1900 | Forbes | 280/223 |
| 651,316 | 6/1900 | Smith | 74/44 |
| 690,835 | 1/1902 | Clayland | 74/127 |
| 713,633 | 11/1902 | Hall | 242/255 |
| 771,864 | 10/1904 | Eager | 74/127 |
| 829,279 | 8/1906 | Mears | 74/127 |
| 850,953 | 4/1907 | McDowell | 74/127 |
| 882,845 | 3/1908 | Sachs | 475/300 |
| 931,656 | 8/1909 | Sangster | 475/289 |
| 944,064 | 12/1909 | West | 74/127 |
| 994,359 | 6/1911 | Archer | 192/6 R |
| 1,005,690 | 10/1911 | Carlson | 74/57 |
| 1,019,637 | 3/1912 | Hays | 74/127 |
| 1,025,989 | 4/1912 | Master | 440/25 |
| 1,047,509 | 12/1912 | Dziak | 74/127 |

(List continued on next page.)

FOREIGN PATENT DOCUMENTS

| | | |
|---|---|---|
| 631286 | 9/1927 | (FR) . |
| 6855 | of 1891 | (GB) . |
| 20936 | of 1896 | (GB) . |
| 2339177 * | 1/2000 | (GB) . |

OTHER PUBLICATIONS 24 pages from miscellaneous web sites.

*Primary Examiner*—Brian L. Johnson
*Assistant Examiner*—Daniel Yeagley
(74) *Attorney, Agent, or Firm*—Jeffrey Weiss; Harry M. Weiss; Weiss & Moy, P.C.

(57) ABSTRACT

A wheelchair is provided with a helical drive mechanism. A rectilinear input to the helical drive causes an output gear to rotate, thus providing power to rotate the driving wheels of a wheelchair. The helical drive may include, for example, a compound helix, a drive with a twisted flat bar, or a concentric helix drive. Add-on components may be provided to convert a conventional wheelchair to a wheelchair powered by a helical drive mechanism.

21 Claims, 11 Drawing Sheets

U.S. PATENT DOCUMENTS

| | | | |
|---|---|---|---|
| 1,072,701 | 9/1913 | Collins | 74/127 |
| 1,076,179 | 10/1913 | Whitehead | 74/127 |
| 1,108,392 | 8/1914 | Picken | 440/25 |
| 1,122,085 | 12/1914 | Dudgeon | 74/57 |
| 1,122,376 | 12/1914 | Farmer | 74/57 |
| 1,232,202 | 7/1917 | Brown | 74/57 |
| 1,316,558 | 9/1919 | Cannon | 74/57 |
| 1,389,039 | 8/1921 | Estes | 74/57 |
| 1,413,036 | 4/1922 | Krantz | 74/127 |
| 1,482,689 | 2/1924 | Landes | 74/127 |
| 1,559,578 | 11/1925 | Morgan | 74/127 |
| 1,699,687 | 1/1929 | Conterio | 74/127 |
| 1,709,952 | 4/1929 | Ricketts | 43/21 |
| 1,713,219 | 5/1929 | Eisenhauer | 74/57 |
| 1,734,649 | 11/1929 | Shull | 74/57 |
| 1,736,507 | 11/1929 | Peterson | 74/57 |
| 1,736,822 | 11/1929 | Dreisbach | 74/57 |
| 1,776,331 | 9/1930 | Lee | 74/127 |
| 1,780,398 | 11/1930 | Morgan | 74/57 |
| 1,799,458 | 4/1931 | Ekstromer | 74/57 |
| 1,813,468 | 7/1931 | Snyer | 244/64 |
| 1,955,973 | 4/1934 | Norton | 43/20 |
| 2,023,889 | 12/1935 | Kramps | 208/22 |
| 2,028,311 | 1/1936 | Berry | 43/20 |
| 2,041,319 | 5/1936 | Blomgren | 123/58 |
| 2,084,321 | 6/1937 | Corradino et al. | 74/57 |
| 2,137,649 | 11/1938 | Hilliard | 230/173 |
| 2,143,799 | 1/1939 | Ribe | 74/280 |
| 2,153,870 | 4/1939 | Lee | 121/119 |
| 2,193,394 | 3/1940 | Deckert, Jr. | 74/57 |
| 2,245,457 | 6/1941 | Brassell | 74/57 |
| 2,296,164 | 9/1942 | Humphrey | 74/57 |
| 2,301,852 | 11/1942 | Brown | 74/275 |
| 2,321,828 | 6/1943 | Lane | 74/57 |
| 2,389,918 | 11/1945 | Macgill | 230/58 |
| 2,411,438 | 11/1946 | Lane | 103/158 |
| 2,425,813 | 8/1947 | Kuntz | 230/217 |
| 2,578,559 | 12/1951 | Korsgren | 74/60 |
| 2,588,524 | 3/1952 | Herbert | 242/84.4 |
| 2,612,312 | 9/1952 | Clarke | 230/185 |
| 2,895,576 | 7/1959 | Schwerdhofer | 192/6 |
| 2,988,186 | 6/1961 | Dotter | 192/47 |
| 3,102,436 | 9/1963 | Schuller | 74/750 |
| 3,107,541 | 10/1963 | Parsus | 74/57 |
| 3,113,472 | 12/1963 | Schwerdhofer | 74/750 |
| 3,113,652 | 12/1963 | Schwerdhofer | 192/6 |
| 3,114,442 | 12/1963 | Schwerdhofer | 192/6 |
| 3,122,226 | 2/1964 | Schuller et al. | 192/6 |
| 3,166,171 | 1/1965 | Schwerdhofer et al. | 192/64 |
| 3,192,783 | 7/1965 | Cruzan | 74/89 |
| 3,194,089 | 7/1965 | Schwerdhofer | 74/750 |
| 3,299,720 | 1/1967 | Schudalla, Sr. et al. | 74/57 |
| 3,588,144 | 6/1971 | Padial | 280/236 |
| 3,633,938 | 1/1972 | Solomon | 280/255 |
| 3,670,856 * | 6/1972 | Segawa | 192/6 A |
| 3,771,918 | 11/1973 | Winter | 417/266 |
| 3,809,195 | 5/1974 | Schulz et al. | 192/6 A |
| 3,828,627 | 8/1974 | Schwerdhofer | 74/750 B |
| 3,834,733 | 9/1974 | Harris | 280/251 |
| 3,877,725 | 4/1975 | Barroza | 280/242 WC |
| 3,886,807 | 6/1975 | Ellis | 74/521 |
| 3,891,235 | 6/1975 | Shelly | 280/252 |
| 3,908,807 | 9/1975 | Ozaki et al. | 192/6 A |
| 3,916,866 | 11/1975 | Rossi | 123/197 R |
| 3,922,005 | 11/1975 | Bundschuh | 280/237 |
| 3,937,309 | 2/1976 | Schulz et al. | 192/6 A |
| 3,954,282 | 5/1976 | Hege | 280/251 |
| 3,984,129 | 10/1976 | Hege | 280/251 |
| 3,991,736 | 11/1976 | Spellman | 123/197 R |
| 3,994,509 | 11/1976 | Schaeffer | 280/242 WC |
| 3,998,469 | 12/1976 | Ruys | 280/254 |
| 4,004,299 | 1/1977 | Runge | 3/1.7 |
| 4,019,230 | 4/1977 | Pollard | 280/214 |
| 4,029,334 | 6/1977 | Trammell, Jr. | 280/261 |
| 4,052,912 | 10/1977 | Vukelic | 74/512 |
| 4,081,155 | 3/1978 | Kuan | 244/72 |
| 4,084,836 | 4/1978 | Lohr | 280/254 |
| 4,145,166 | 3/1979 | Justice | 417/519 |
| 4,161,328 | 7/1979 | Efros | 280/290 |
| 4,169,609 | 10/1979 | Zampedro | 280/241 |
| 4,186,934 | 2/1980 | Collings | 280/221 |
| 4,227,712 | 10/1980 | Dick | 280/236 |
| 4,272,096 | 6/1981 | Efros | 280/255 |
| 4,276,003 | 6/1981 | Perkins et al. | 417/415 |
| 4,277,706 | 7/1981 | Isaacson | 310/80 |
| 4,400,999 | 8/1983 | Steuer | 74/781 B |
| 4,411,442 | 10/1983 | Rills | 280/221 |
| 4,421,334 | 12/1983 | Efros | 280/236 |
| 4,462,345 | 7/1984 | Routery | 123/58 C |
| 4,473,236 | 9/1984 | Stroud | 280/258 |
| 4,493,614 | 1/1985 | Chu et al. | 417/22 |
| 4,536,130 | 8/1985 | Orlando et al. | 417/63 |
| 4,560,181 | 12/1985 | Herron | 280/242 WC |
| 4,597,302 | 7/1986 | McLendon, Jr. | 74/57 |
| 4,625,580 | 12/1986 | Burt | 74/594.4 |
| 4,630,839 | 12/1986 | Seol | 280/255 |
| 4,657,273 | 4/1987 | Slater | 280/271 |
| 4,702,486 | 10/1987 | Tsuchie | 280/255 |
| 4,758,013 * | 7/1988 | Agrillo | 280/242 |
| 4,763,544 * | 8/1988 | Blakemore | 74/752 |
| 4,770,433 | 9/1988 | Hartmann | 280/260 |
| 4,796,430 | 1/1989 | Malaker et al. | 62/6 |
| 4,828,284 | 5/1989 | Sandgren | 280/221 |
| 4,829,841 | 5/1989 | Ogawa | 74/127 |
| 4,858,483 * | 8/1989 | Blakemore | 74/143 |
| 4,861,055 | 8/1989 | Jones | 280/234 |
| 4,942,936 | 7/1990 | Gardner, Jr. | 180/207 |
| 4,958,830 | 9/1990 | Huggins et al. | 272/69 |
| 5,007,631 | 4/1991 | Wang | 272/70 |
| 5,007,655 * | 4/1991 | Hanna | 280/250.1 |
| 5,156,412 | 10/1992 | Meguerditchian | 280/241 |
| 5,167,168 | 12/1992 | Beumer | 74/810.1 |
| 5,172,926 | 12/1992 | Mannino | 280/252 |
| 5,180,351 | 1/1993 | Ehrenfried | 482/52 |
| 5,182,962 | 2/1993 | Leiter | 74/473 |
| 5,209,190 | 5/1993 | Paul | 123/43 AA |
| 5,236,211 | 8/1993 | Meguerditchian | 280/241 |
| 5,242,181 | 9/1993 | Fales et al. | 280/251 |
| 5,280,936 | 1/1994 | Schmidlin | 280/234 |
| 5,290,054 | 3/1994 | Po | 280/288.1 |
| 5,295,927 | 3/1994 | Easley et al. | 482/52 |
| 5,299,819 | 4/1994 | Leu | 280/260 |
| 5,310,202 | 5/1994 | Goodspeed | 280/222 |
| 5,335,927 | 8/1994 | Islas | 280/255 |
| 5,443,279 | 8/1995 | Nurnberger | 280/236 |
| 5,451,070 | 9/1995 | Lindsay et al. | 280/252 |
| 5,452,647 | 9/1995 | Murakami et al. | 92/71 |
| 5,472,320 | 12/1995 | Weisbrodt | 417/326 |
| 5,486,016 | 1/1996 | Godin et al. | 280/250.1 |
| 5,514,053 | 5/1996 | Hawkins et al. | 482/63 |
| 5,540,456 | 7/1996 | Meier-Burkamp et al. | 280/236 |
| 5,542,335 | 8/1996 | Goodyear | 91/61 |
| 5,542,340 | 8/1996 | Murakami et al. | 92/71 |
| 5,785,337 * | 7/1998 | Ming | 280/255 |

* cited by examiner

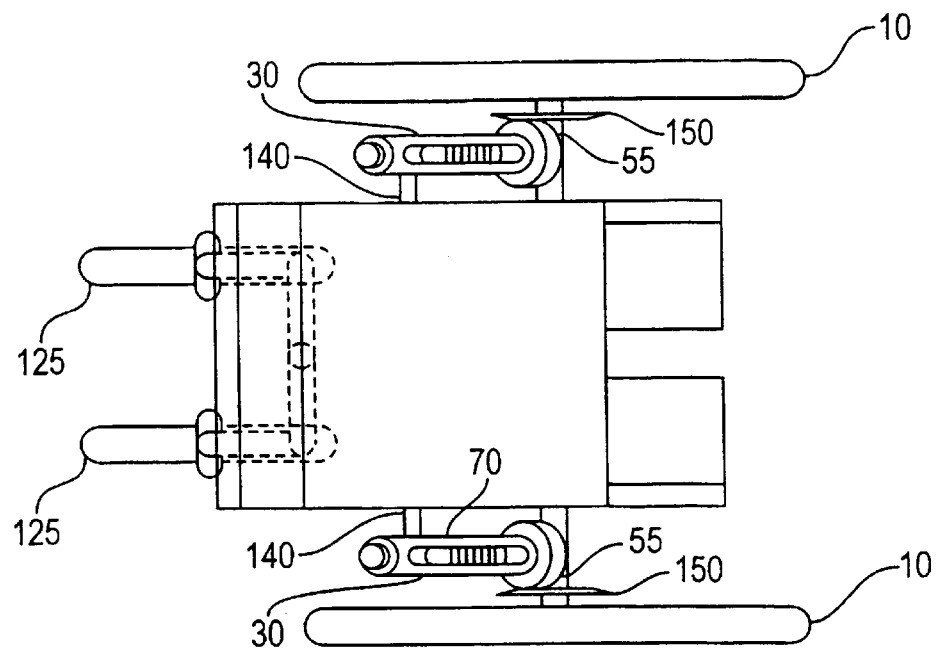
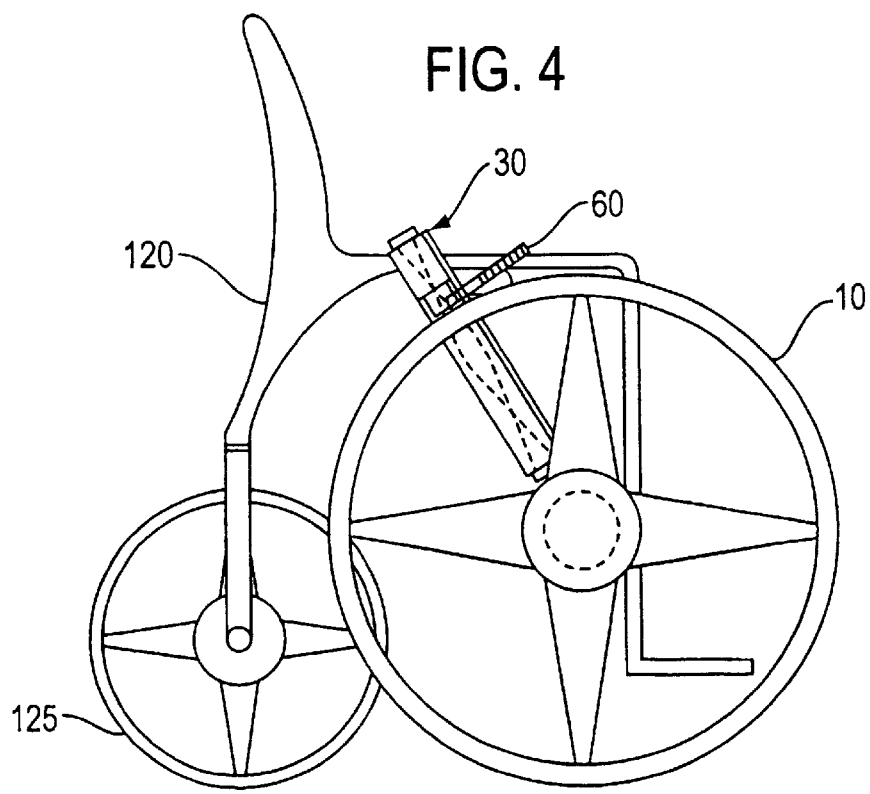

HELICAL DRIVE WHEELCHAIR

CROSS REFERENCE TO RELATED APPLICATIONS

This application is a continuation-in-part of U.S. patent application Ser. No. 08/771,982, filed on Dec. 23, 1996. This application also claims priority from the following provisional applications: Helical Drive Wheelchair, Lawnmower, and Golf Cart, filed Jun. 9, 1997; In-Line Multi-Gear System for Bicycles and Other Applications, Multiple Multi-Gear Systems, and Shifting Devices, filed, Jun. 20, 1997; Multi-Gear Hub, In-Line Multi-Gear System, and Vehicles, filed Jun. 9, 1997; Helical Drive and Motors, filed Apr. 7, 1997; Helical Drive Vehicles, filed Apr. 8, 1997; Improved Helical Drives, filed Apr. 16, 1997; Helical Fishing Reels, filed Apr. 7, 1997; Multiple Ratio Slotted Helix, filed May 1, 1997; Polycycle filed Apr. 7, 1997; Polycycle II, filed Apr. 17, 1997; Improved Slider and Helical Drives, filed Jun. 9, 1997; and Helical Drive Fitness Equipment, Wench, Contained Mono-Helix Drive, filed Jun. 9, 1997.

BACKGROUND OF THE INVENTION

1. Field of the Invention

The present invention relates to wheelchairs.

2. Description of the Related Art

In a conventional non-motorized wheelchair, when powered by the user, the user must grab a large wheel or a hand rail disposed around the large wheel and push in a forward direction for forward movement. To move straight ahead, the user must simultaneously push the two large wheels, one on either side of the user. To cause the wheelchair to turn right, the user must push only on the large wheel or associated hand rail on a left side of the chair. To make a left turn, the user must push only on the wheel or associated hand rail on the right side of the wheelchair.

The motion of pushing the chair requires a certain level of manual dexterity and upper body strength not found in all wheelchair users. Those wheelchair users who lack the required manual dexterity and upper body strength must either have someone push their wheelchair or they must use a more expensive motorized wheelchair. Any speeds, except for very slow speeds, are awkward to obtain.

SUMMARY OF THE INVENTION

The present invention addresses the above problems in the related art and has as its object to provide a wheel chair which can be operated by wheelchair users having less upper body strength and manual dexterity than is required to operate a conventional non-motorized wheelchair.

It is further an object of the invention to provide add-on component parts for converting a conventional non-motorized wheelchair to one which requires less upper body strength and manual dexterity to operate than a conventional non-motorized wheelchair.

A first embodiment of the invention is a wheel chair having two large wheels. One large wheel is disposed on the left side of the wheelchair and another large wheel is disposed on the right side of the wheel chair. Both large wheels are disposed toward a front portion of the wheelchair. A single smaller pivoting wheel is disposed in a central position of a rear portion of the wheelchair. A helical drive is associated with each of the two large wheels. Each helical drive is powered by a rectilinear motion. Such a motion requires less manual dexterity and upper body strength than that which is required to power a non-motorized conventional wheelchair.

A second embodiment is identical to the first embodiment, but instead has two smaller wheels disposed at a rear portion of the wheelchair, one on the left and another on the right. This embodiment has the same advantages as the first embodiment.

A third embodiment has four wheels of equal size. The two front wheels are powered by two parallel mounted helical drives.

A fourth embodiment provides two helical drives for powering the two large rear wheels of a wheelchair. The two front wheels are small and are not powered.

A helical drive is provided which includes a helical member which is a twisted flat bar and a slider. The slider has an opening having the twisted flat bar disposed therethrough. A sliding motion of the slider causes the twisted flat bar to rotate.

Two helical drives for powering the wheelchair are on each wheelchair. Each helical drive includes a pinion gear which engages a crown gear. The crown gears are fixed to the drive wheels of the wheelchair, such that rotation of each of the crown gears causes rotation of the respective wheel.

Add-on components for converting a conventional wheelchair to one which is powered by a helical drive are provided, thereby gaining the advantages described in the embodiments described above.

Other objects and features of the invention will appear in the course of the description which follows.

BRIEF DESCRIPTION OF THE DRAWINGS

FIG. 3 is a top plan view of a second embodiment of the helical drive wheelchair having two small pivoting wheels disposed in a rear portion of the wheelchair.

FIG. 4 is a side plan view of the wheelchair shown in FIG. 3.

DESCRIPTION OF THE PREFERRED EMBODIMENTS

Figure 1:
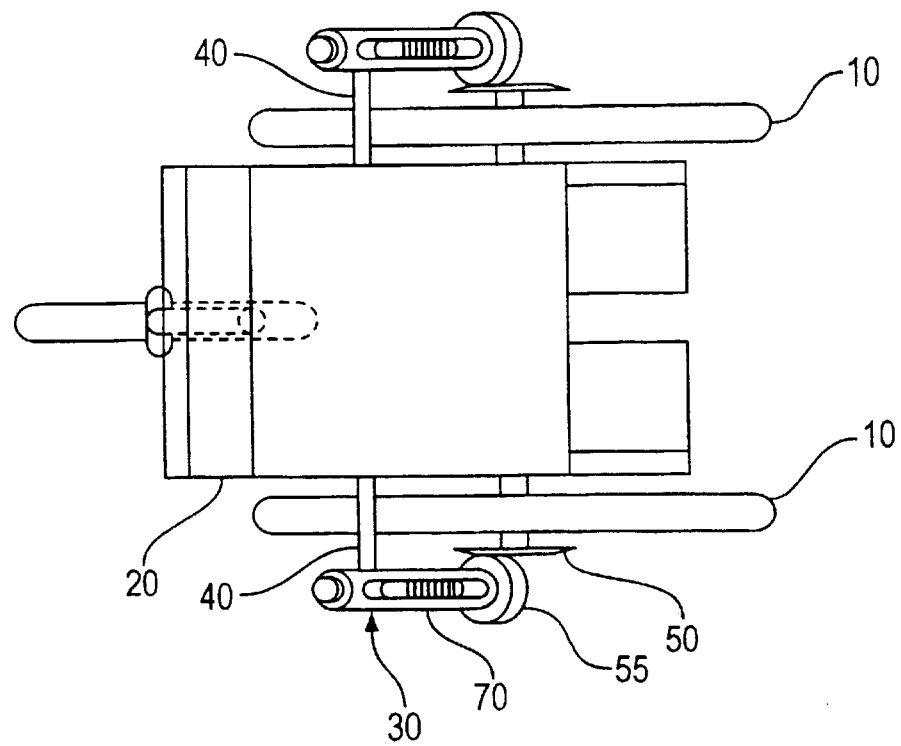
FIG. 1 is a top plan view of a first embodiment of a helical drive wheelchair having a single small pivoting wheel disposed in a rear portion of the wheelchair.
Figure 2:
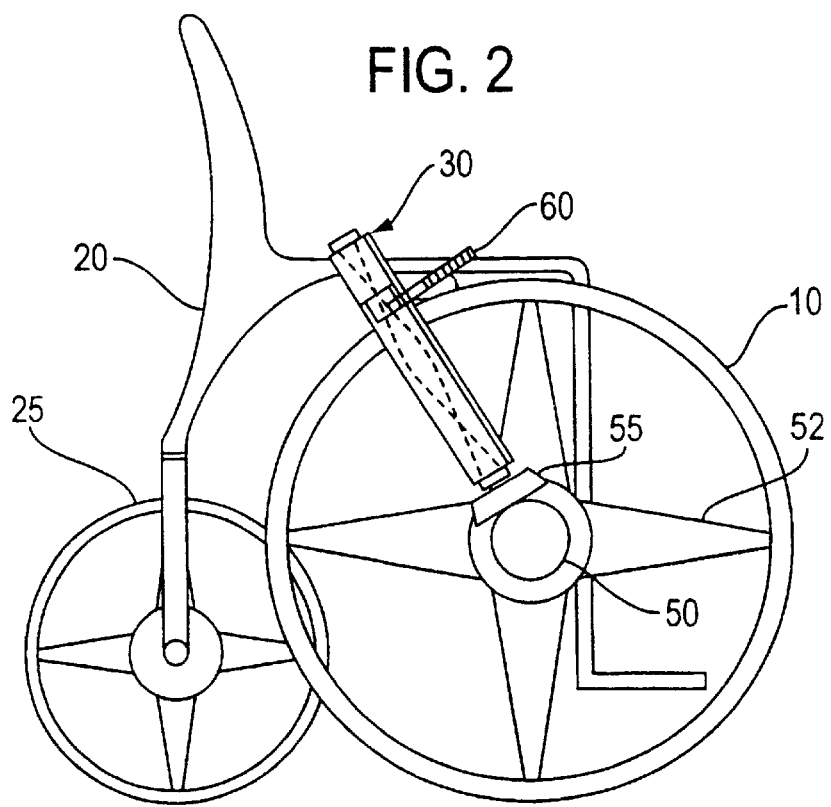
FIG. 2 is a side plan view of the wheel chair shown in FIG. 1.

FIGS. 1 and 2 show a first embodiment of the present invention, a helical drive wheelchair. As shown in the figures, two large wheels 10 are each attached to ends of their respective axles such that the two large wheels 10 protrude from a right and left side of a wheelchair frame 20 close to the front of the wheelchair. A single small pivoting wheel 25 is mounted in a central position of the rear of the wheel chair.

A helical drive is disposed on the right and left sides of the wheel chair. Each helical drive 30 is attached to the frame 20 via a rod 40 extending outward from the frame 20 on the left and right sides of the wheelchair, such that each helical drive 30 is disposed on an outer side of a corresponding large wheel 10. An annular crown gear 50 protrudes outwardly from a hub of each large wheel 10. The hub is fixedly attached to elongated sections or spokes 52 which extend from the hub to the annular rim of the wheel 10. Each helical drive 30 has a pinion gear 55 protruding from an end of the helical drive. The pinion gear 55 is disposed in contact with the crown gear 50, such that rotation of the pinion gear 55 causes the crown gear to rotate, thereby rotating the large wheel. The helical drive 30 has an input device including a handle 60. Sliding the handle 60 along a slot formed in an outer casing 70 of the helical drive 30 in one direction causes a helical member within the outer casing 70 to rotate, thereby causing the pinion gear 55 to rotate. Moving the handle 60 in the other direction causes the helical drive to free wheel and resets the handle 60.

FIGS. 3 and 4 show a second embodiment of the present invention. As shown in the figures, two large wheels 10 are each attached to ends of their respective axles such that the two large wheels 10 protrude from a right and left side of a wheelchair frame 120 close to the front of the wheelchair. Two small pivoting wheels 125 are mounted on left rear and right rear portions of the frame 120. Two helical drives 30 are disposed on the right and left sides of the wheel chair. Each helical drive 30 is attached to the frame 120 via a rod 140 extending outward from the frame 120 on the left and right sides of the wheelchair, such that each helical drive 30 is disposed on an inner side of a corresponding large wheel 10. An annular crown gear 150 protrudes inwardly from a hub portion of each large wheel 10. Each helical drive has a pinion gear 55 protruding from an end of the helical drive. The pinion gear 55 is disposed in contact with the crown gear 150, such that rotation of the pinion gear 55 causes the wheel driving gear to rotate, thereby rotating the large wheel 10. The helical drive 30 has an input device including a handle 60. Sliding the handle 60 in one direction along a slot formed in an outer casing 70 of the helical drive 30 causes a helical member within the outer casing 70 to rotate, thereby causing the pinion gear 55 to rotate. Moving the handle 60 in the other direction causes the helical drive to free wheel and resets the handle 60.

The first two embodiments show a wheelchair having large wheels disposed toward the front of the wheelchair. However, the large wheels could be disposed toward the rear of the wheelchair and pivoting small wheels disposed toward the front of the wheelchair, as in FIGS. 7 and 8.

Figure 12:
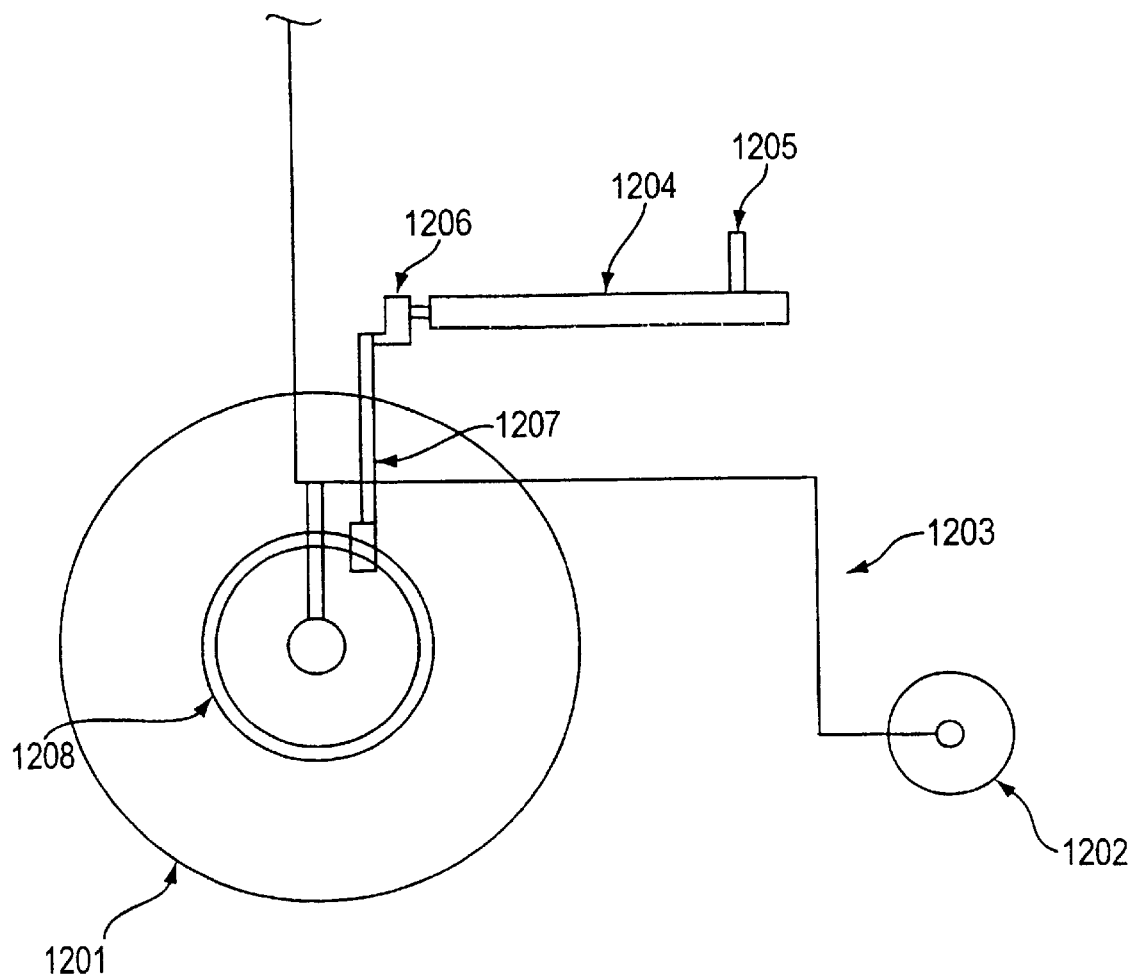
FIG. 12 shows another embodiment.

The embodiments in FIGS. 1, 2, 3, 4, 7, and 8, show helical drives directly connected to the drive wheels, and oriented radial to the wheels. However, other orientations are possible, with a linkage connecting the pinion gear of the helical drive with the crown gear on the wheel. The linkage could be, for example, a belt drive, a chain drive, or a drive shaft. For example, the helical drive may be horizontal, parallel to the ground, with a drive shaft connecting the pinion gear on the helical drive to the crown gear on the drive wheel. See for example, in FIG. 12, drive wheel 1201, and front wheel 1202 are attached to the frame 1203. Helical drive 1204, with handle 1205 and pinion gear 1206, drives wheel 1201, through drive shaft 1207. Shaft 1207 connects pinion gear 1206 to annular crown gear 1208 fixed to wheel 1201. This drive shaft arrangement can also be used in the front wheel drive wheelchair in FIGS. 1 and 2. The helical drive can be installed at any angle.

Figure 5:
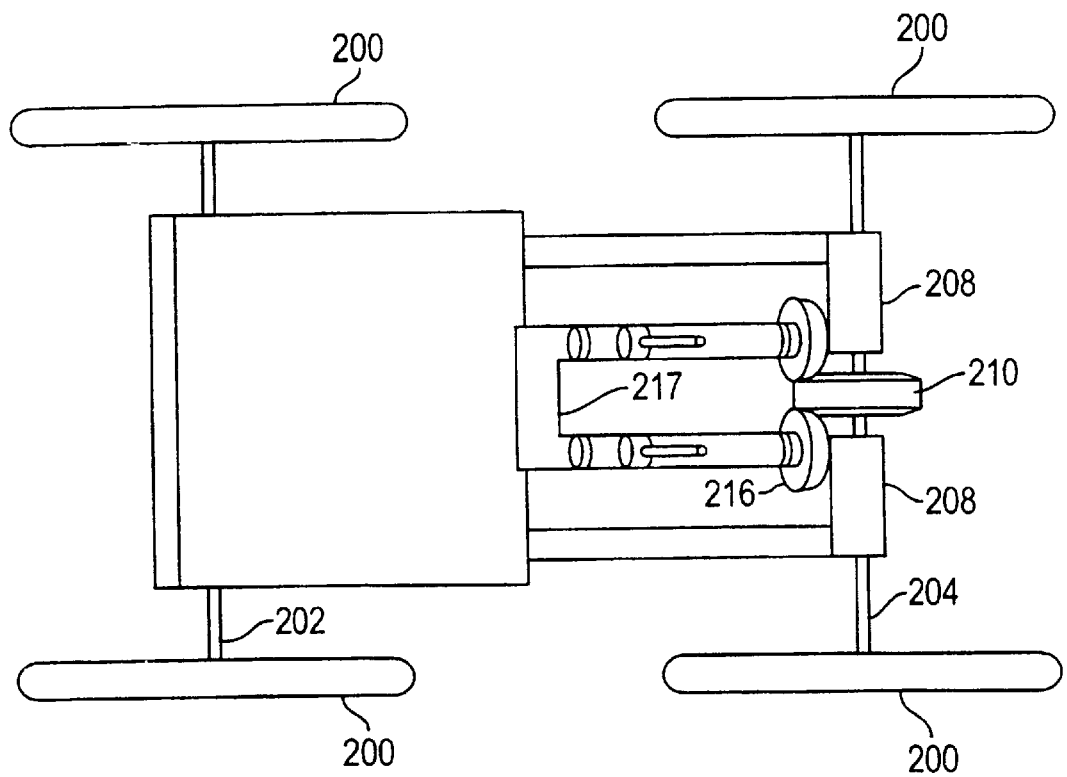
FIG. 5 is a top plan view of a third embodiment of a wheelchair having four wheels of equal size.
Figure 6:
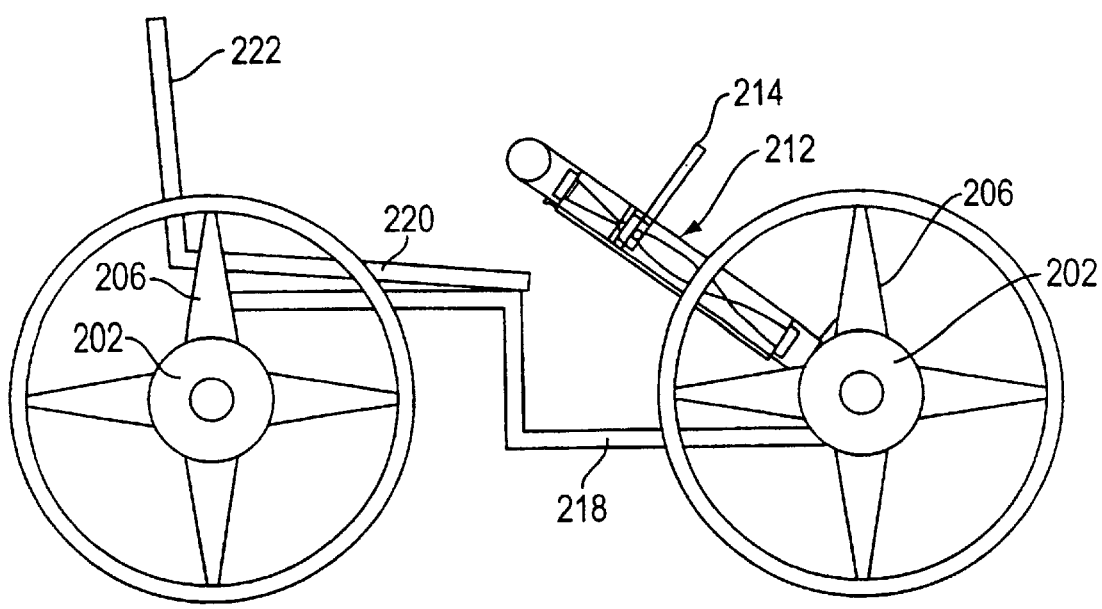
FIG. 6 is a side plan view of the wheelchair shown in FIG. 5.

FIGS. 5 and 6 show the next embodiment of the helical drive wheelchair. This embodiment comprises four wheels 200 of approximately the same size. Each wheel has a hub 202 fixedly attached to an end of an axle 204 or 202. Each hub 202 is disposed in the center of an area defined by an annular rim of the wheel 200. The hub is fixedly attached to elongated sections or spokes 206 which extend from the hub to the annular rim of the wheel 200. The front axle 204 is received in an opening formed in two axle receiving sections 208 which are aligned such that the axle 204 passes through the opening formed in both axle receiving sections 208. An annular crown gear 210 is disposed on a portion of the axle 204 such that the axle 204 is fixedly attached to and disposed through the center of the crown gear. Two parallel helical drives 212, each having a slidable disposed handle 214, are disposed such that a pinion gear 216 extending from an end of each helical drive 212 engages the crown gear 210. The two helical drives 212 include a connecting section 217 which extends between the two helical drives 212 and integrally connects the helical drives 212. A frame 218 extends from the axle receiving sections 208 toward the rear of the wheelchair. The rear of the frame 218 includes an opening forming a rear axle receiving section (not shown) through which the rear axle 202 passes. Like the front wheels 200, a hub of each of the rear wheels 200 is attached to an end of the rear axle 202. A seat 220 is disposed over a rear section of the frame 218 extending to the rear wheels 200. A seat back 222 extends upward from an end of the seat 220 closest to the rear of the wheelchair such that the seat back 222 forms an angle with the seat 220 which is more than 90 degrees.

A seated user of the wheelchair operates the wheelchair by sliding the handles 214 of the helical drives 212. The sliding motion causes a helical member in each helical drive to rotate. When viewed from a perspective of a person seated in the wheelchair, the right helical drive 212 causes the corresponding pinion gear 216 to rotate in a clockwise direction and the left helical drive 212 causes the corresponding pinion gear 216 to rotate in a counterclockwise direction. The pinion gears 216 engage the crown gear 210 thereby forcing the crown gear 210 to rotate in a forward direction.

Figure 7:
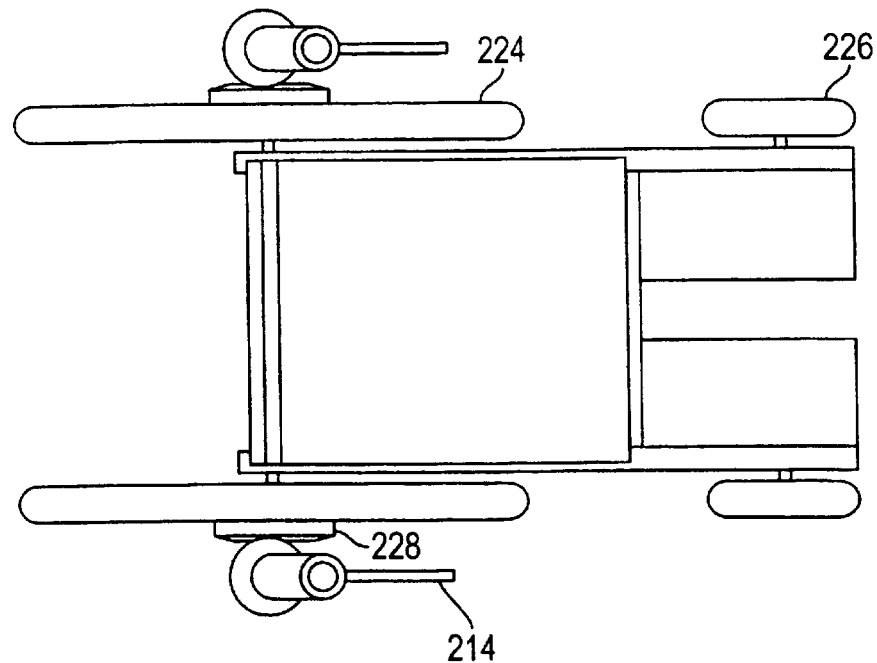
FIG. 7 is a top plan view of a fourth embodiment of a wheelchair having two large wheels driven by helical drives and two small front wheels.
Figure 8:
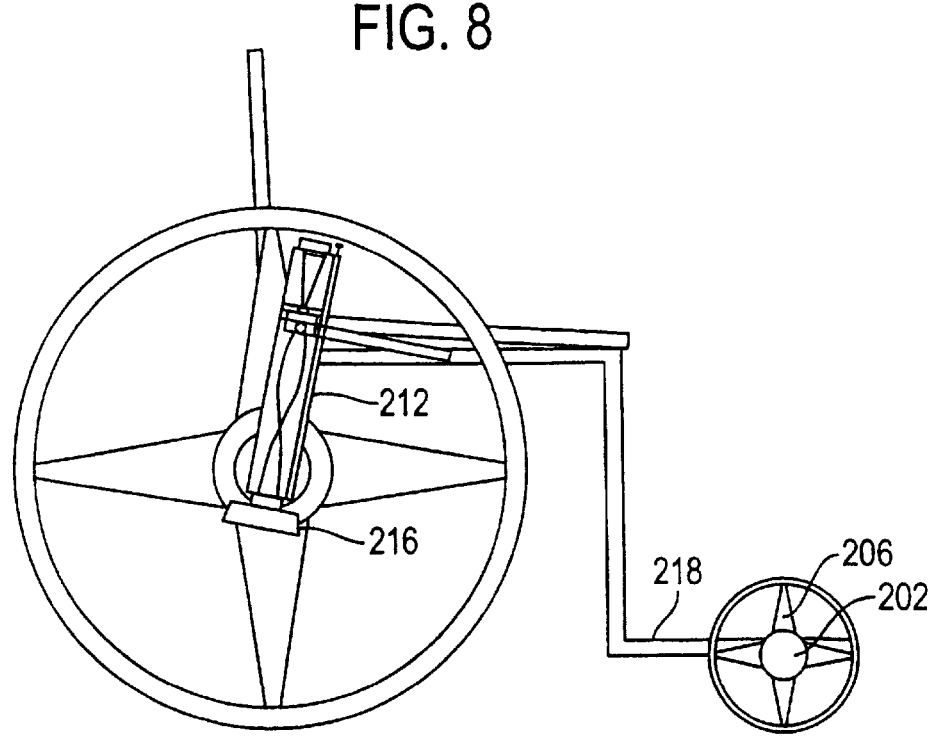
FIG. 8 is a side plan view of the wheelchair shown in FIG. 7.

FIGS. 7 and 8 show the next embodiment of the wheelchair. This embodiment includes two large wheels 224 disposed toward the rear of the wheel chair and two small wheels 226 disposed toward the front of the wheel chair. Each of the wheels has a hub 202 and spokes 206. Each hub is attached to an axle. The front axle is disposed through openings formed in the frame. Extending outward from the hub of each of the rear wheels 202 is a crown gear 228. A pinion gear 216 extending from an end of the helical drive 212 is engages the crown gear 228 such that when the pinion gear 216 rotates, the crown gear 228 rotates.

FIGS. 7 and 8 show the helical drives 212 and crown gears 228 being disposed on an outside portion of each large wheel 202. However, the helical drives and crown gears 228 may be disposed on an inner portion of each large wheel 202, as is the case for the embodiments in FIGS. 1, 2, 3, and 4.

A seated user of the wheelchair slides the handle 214 of each helical drive 212 in an up and down direction causing the helical member in each helical drive 212 to rotate. The rotation of the helical drive shaft thereby causes the corresponding pinion gear 216 to rotate. Each pinion gear 216 rotates in a manner such that the crown gear is engaged to rotate in a forward direction. As a result, the two large wheels 202 are thereby forced to rotate in a forward direction causing the wheel chair to move forward.

Figure 9:
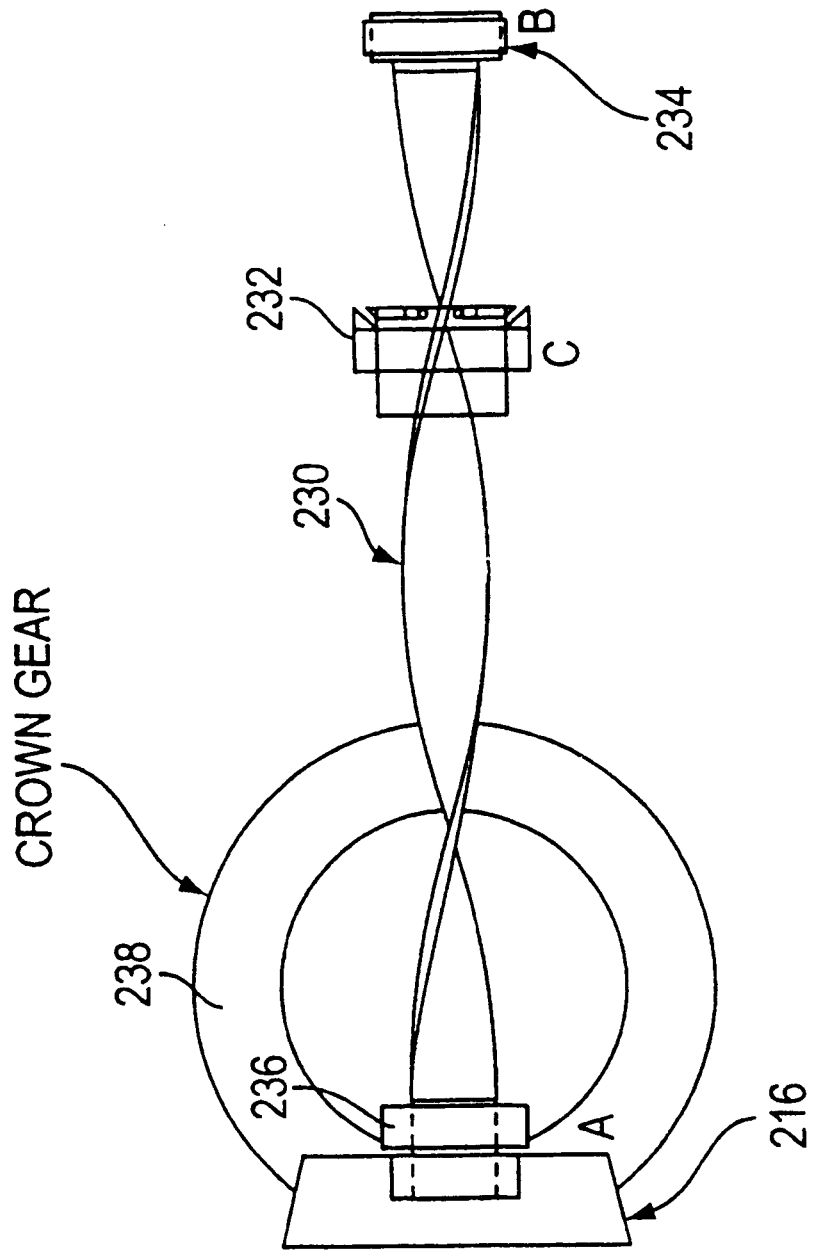
FIG. 9 is a side plan view of the components of an embodiment of a helical drive, as used in FIGS. 1, 2, 3, 4, 7, and 8.

FIG. 9 illustrates a helical member 230 disposed within the helical drive. The helical member 230 comprises a twisted flat bar. A slider 232 forming a thin rectangular opening has the helical member 230 disposed therethrough. One end of the helical member 230 is disposed within a mounting bracket 234. The other end of the helical member 230 is disposed within a roller clutch 236. An rod extends from another end of the roller clutch 236 and is disposed within a center of a pinion gear 216. An outer rim of the pinion gear engages the crown gear 238 such that rotation of the pinion gear 216 causes rotation of the crown gear 238. Thus, sliding of the slider 232 along a length of the helical member 230 causes the helical member 230 to rotate, thereby rotating the pinion gear 216 and the crown gear 238.

Figure 10:
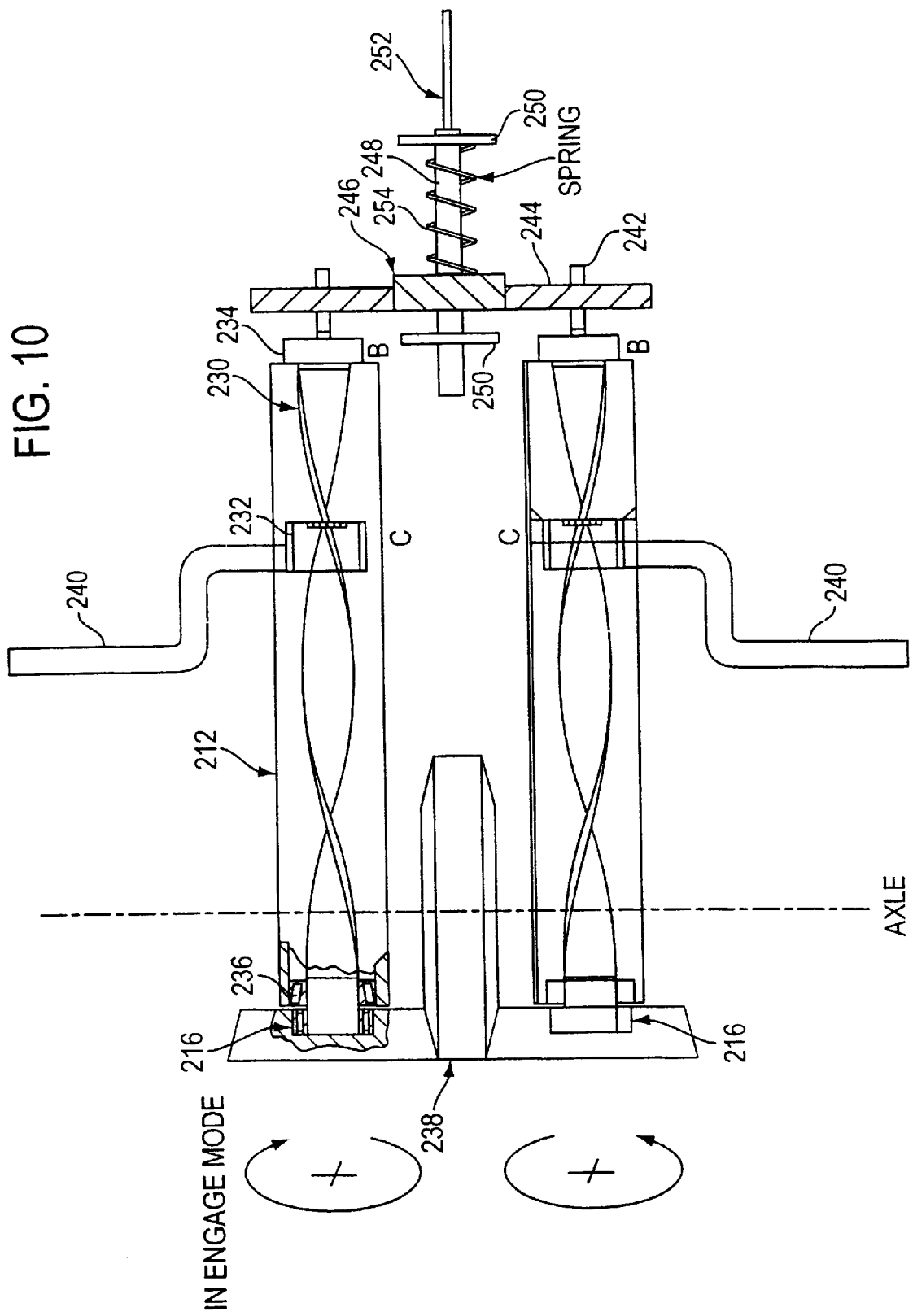
FIG. 10 is a top plan view of an embodiment of two helical drives including a synchronizing gear and a single crown gear having an axle disposed therethrough, as used in FIG. 5 and FIG. 6.

FIG. 10 shows an embodiment of a helical drive arrangement suitable for use with a helical drive wheelchair embodiment in FIGS. 5 and 6. Two helical drives are shown. Each helical drive 212 includes the helical member 230, a roller clutch 236, a mounting bracket 234, and a slider 232 disposed in the manner shown in FIG. 9 and previously discussed. A handle 240 is attached to the slider 232. An end of each of the helical drives 212 have a pinion gear. Disposed between the two pinion gears 216 is a single crown gear 238 such that each pinion gear 216 is engages the crown gear 238. An axle is disposed through an opening in the crown gear 238 and is fixedly attached to the crown gear 238. Extending from each mounting bracket 234 is a rod 242. The rod 242 extends through a center of an output gear 244. A synchronizing gear 246 is disposed between the two output gears 244. A rod 248 is disposed through the center of the synchronizing gear 246. A flange 250 is formed near each of the two ends of the rod 248. A pull cable is attached to one end of the rod facing away from the crown gear 238. A spring 254 is disposed around a section of the rod between the synchronizing gear 246 and the flange 250 closer to the pull cable 252.

The helical drive 212 operates in the same manner as discussed previously. The synchronizing gear serves to preserve a relationship between the movement of a handle 240 of one helical drive with the movement of another handle 240 of the other helical drive 212. By pulling on the pull cable 252, readjusting the position of the handles 240, and releasing the pull cable 252, the relationship between the handles 240 can be altered.

Figure 11:
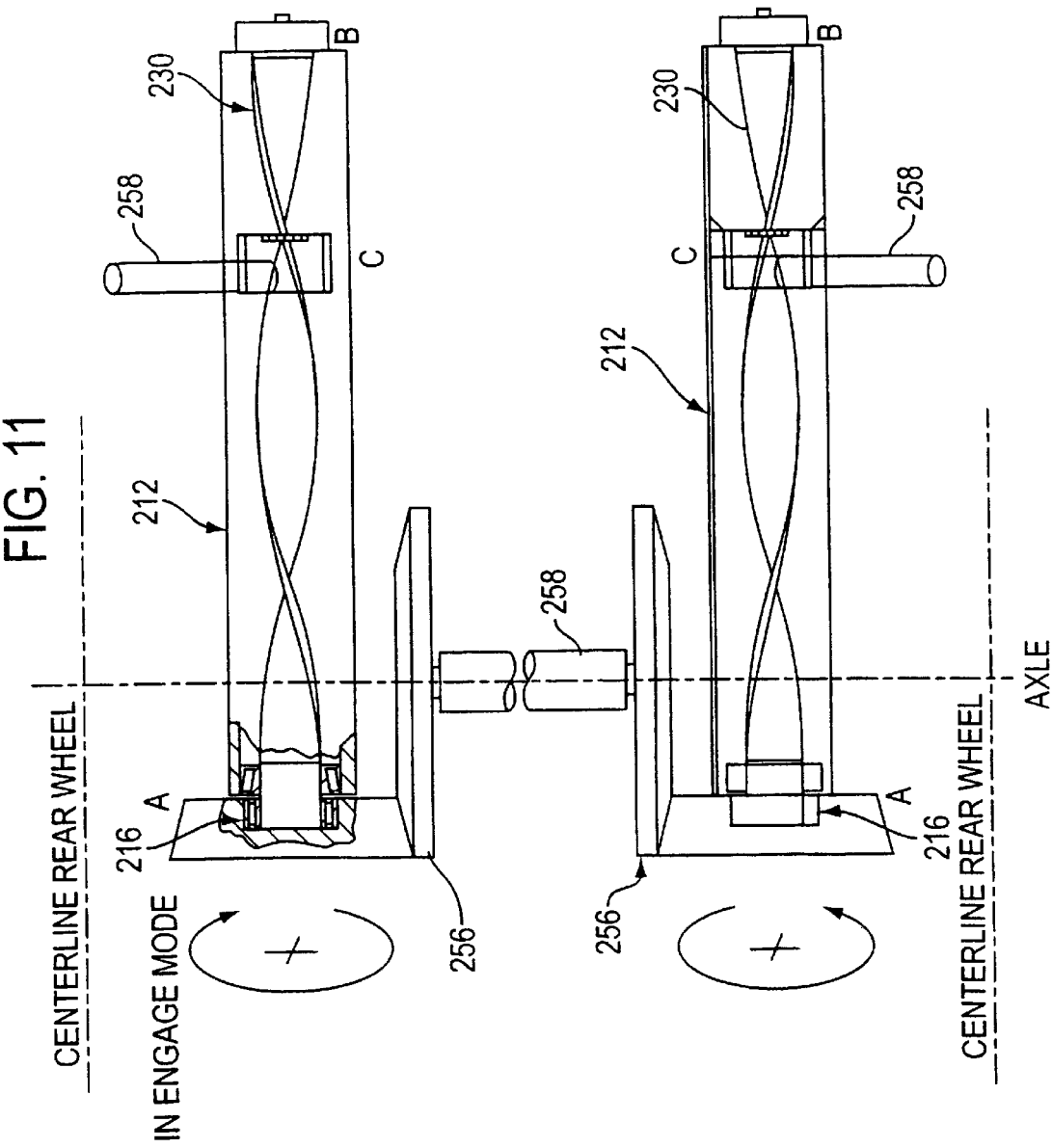
FIG. 11 is a top plan view of two helical drives including a separate crown gear being engaged by a pinion gear of each helical drive, as used in FIGS. 1, 2, 3, 4, 7, and 8.

FIG. 11 shows two helical drives 212 which are similar to the helical drives shown in FIG. 10. The pinion gear 216 of each helical drive 212 is engages a separate crown gear 256. An axle 258 is disposed between the two crown gears 256. This is the same helical drive used in the helical drive wheelchair shown in FIGS. 7 and 8.

Sliding the handles 258 cause corresponding helical members 230 to rotate. The rotation of the helical members 230 cause the corresponding pinion gears 256 to rotate engaging the corresponding crown gears 256, thereby causing the crown gears 256 to rotate.

The helical drive provides a constant torque to the wheels of the wheelchair. Additional advantages and modifications will readily occur to those skilled in the art. Therefore, the invention is not limited to the specific details and representative devices shown and described herein. Accordingly, various modifications to the embodiments of the invention may be made without departing from the spirit or scope of the invention as defined by the appended claims and their equivalents.

Also any embodiment may use other configurations of helical drives, such as, for example, a compound helix, or a concentric helix, or a contained helix. Also, motorized helical drives may be used.

Transmissions may be provided in the wheel chairs. Multi-gear hubs on the drive wheels may be used, or currently found on some bicycles. Or helical drive mechanisms can be used with in-line transmissions.

The wheel chairs of the present invention can be operated in reverse in the conventional manner, by the user manually grabbing the drive wheels and rotating them backwards manually, allowing the helical drive mechanisms to free-wheel. Alternatively, reverse gears can be installed in the helical drive mechanisms to allow helical driven reverse movement.

The helical drives shown herein deliver power only when the handle is used in one direction, and free-wheel when the handle is moved to reset in the other direction. However, other helical drives can be used, that give power in the same direction, when the handle is moved in both directions, such as the concentric helical drive and compound helical drive.

Figure 13:
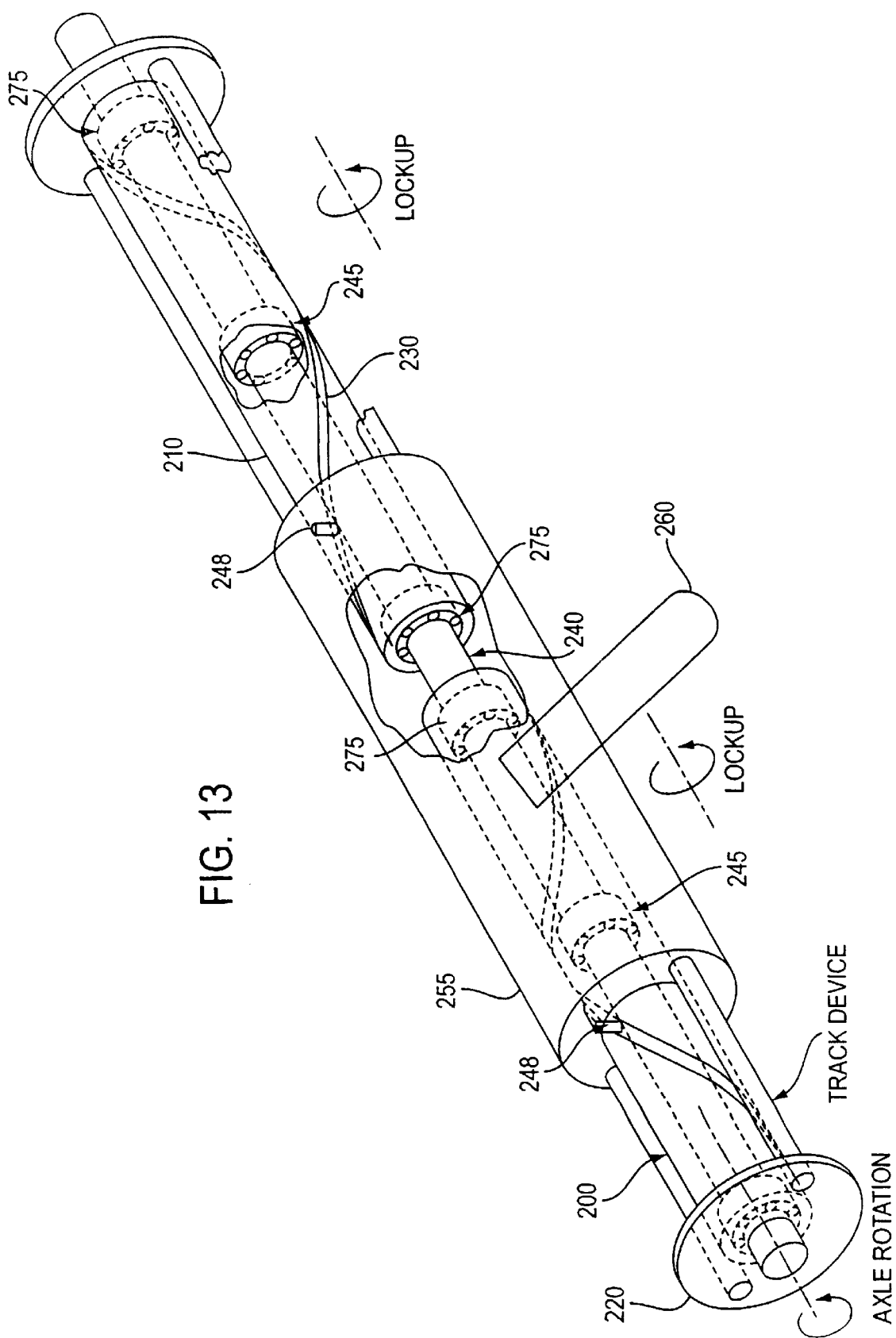
FIGS. 13–16 show other helical drive configurations.

FIG. 13 shows a compound helix drive for powering a helical wheelchair. A first cylindrical screw 200 is disposed closer to an output gear 220 and a second cylindrical screw 210 is disposed further from the output gear 220. In this embodiment, each cylindrical screw 200, 210 is a cylindrical tube with a groove 230 extending in a spiral around the cylindrical tube and along a length of the cylindrical tube. The groove 230 on the first cylindrical screw 200 extends in a direction opposite to the direction of the groove 230 on the second cylindrical screw 210. Extending through the first and the second cylindrical screws 200, 210 is an axle 240. Two roller clutches 245 are mounted on the axle 240 such that the axle 240 passes through the center of each of the two roller clutches and an outer rim of a respective roller clutch is in contact with an inside surface of a corresponding one of the cylindrical screws 200, 210. A sleeve 255 of an input device is slidable disposed along the outer surface of the cylindrical screws 200, 210. Two input shafts 248 extend from an inside surface of the sleeve 255 facing toward a respective one of the cylindrical screws 200, 210. An end of each input shaft 248 is slidable disposed within a respective groove 230 of a corresponding cylindrical screw 200, 210. An input device handle 260 extends outward from an outside surface of the sleeve 255 and passes through a slot (not shown) formed on the outer casing (not shown). The slot extends along a side of the outer casing in a direction parallel to the lengthwise direction of the two cylindrical screws 200, 210. A bearing 275 is disposed around a first end of the axle 240 close to the output gear 220. The outer surface of the bearing is in contact with an inner surface of the first cylindrical screw 200. The first end of the axle 240 is disposed within a hole formed in the center of output gear 220. A second bearing 275 is disposed around the axle 240, such that the outer surface of the second bearing is in contact with an inner surface of the second cylindrical screw 210 close to an end of the second cylindrical screw 210 opposite to an end closer to the output gear 220. The second bearing 275 is attached to an end cap (not shown), which, in turn, is attached to an inside end of the outer casing (not shown). A third bearing 275 is disposed around the axle 240, such that the outer surface of the third bearing is in contact with an inner surface of the first cylindrical screw 200 close to an end of the first cylindrical screw 200 opposite to an end closer to the output gear 220. A fourth bearing 275 is disposed around the axle 240, such that the outer surface of the fourth bearing is in contact with the inner surface of the second cylindrical screw 210 near an end of the second cylindrical screw 210 closer to the output gear 220.

Moving the handle 260 of the input device from a position within the slot in the outer casing further from the output gear 220 to a position within the slot of the outer casing near the output gear causes the input shafts 248 attached to the inner surface of the sleeve 55 to move along the grooves 230 of the first and second cylindrical screws, thereby forcing the second cylindrical screw 210 to move in a clockwise (when viewed from a direction of the output gear 220) and the first cylindrical screw 200 to move in a counterclockwise direction. Moving the input device across the slot of the outer casing in an opposite direction forces the first and second cylindrical screws 200, 210 to rotate in an opposite direction. When each of the two cylindrical screw rotates in the clockwise direction, the roller clutch 245, which is in contact with a corresponding cylindrical screw 200, 210 will cause the axle 240 to remain stationary. Thus, the corresponding cylindrical screw 200, 210 is said to be free-wheeling and not producing any torque. When each of the two cylindrical screws 200, 210 rotates in a counterclockwise direction, the roller clutch 245, which is in contact with a corresponding cylindrical screw 200, 210, will cause the axle 240 to rotate in the counterclockwise direction. The rotation of the axle 240 in the counterclockwise direction causes the output gear 220 to rotate in a counterclockwise direction.

Figure 14:
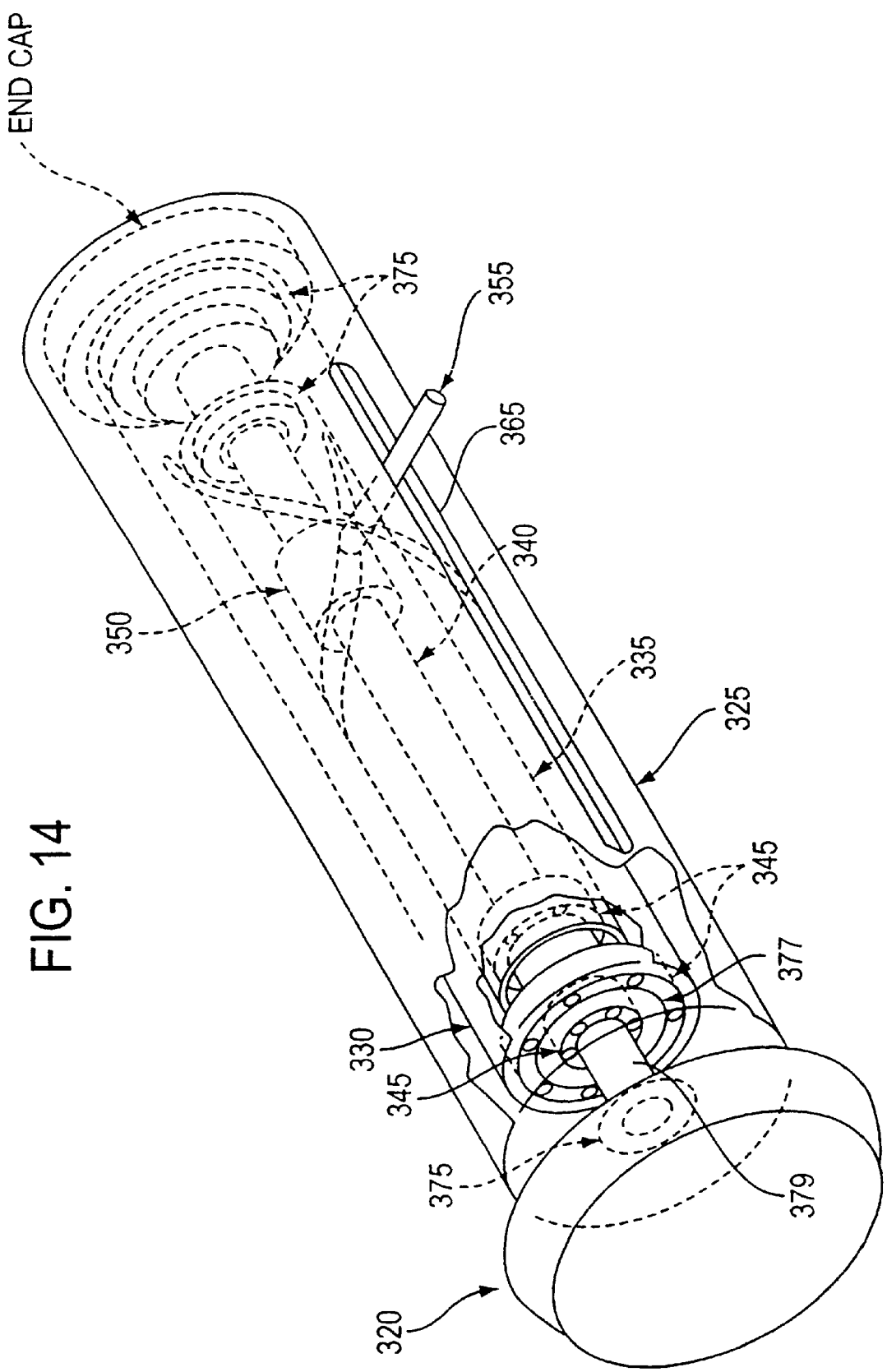
Figure 15:
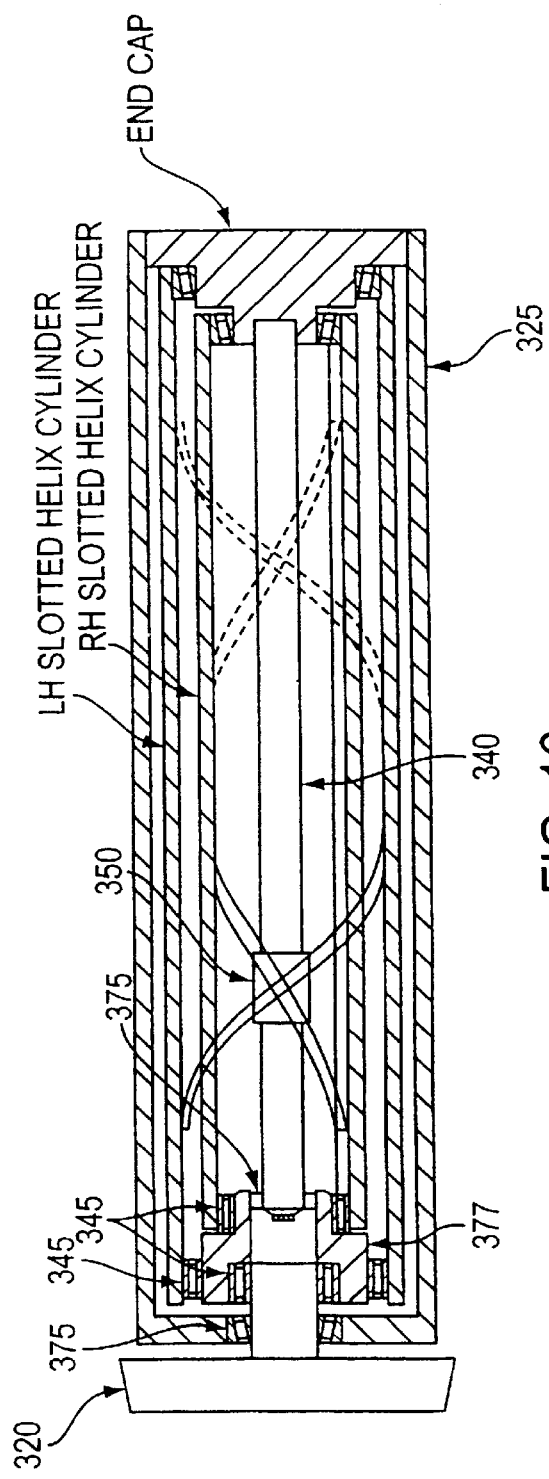
Figure 16:
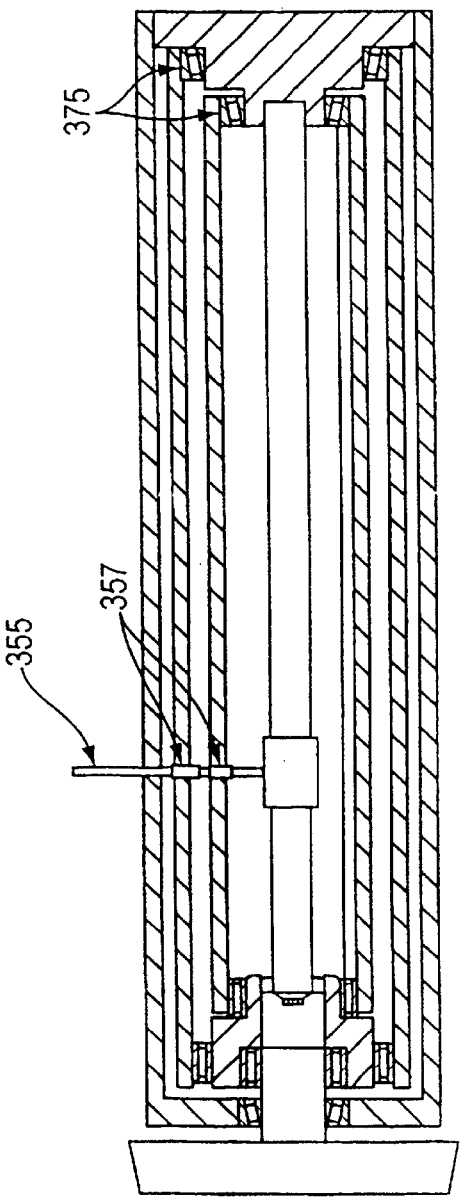

FIGS. 14, 15, and 16 illustrate a concentric helix drive for a wheelchair. Only the differences from the previous embodiment of a helical drive, shown in FIG. 13, shall be discussed.

Instead of two cylindrical screws as shown in FIG. 13, this embodiment includes a left-handed (or "LH") slotted helix cylinder 330 and a right-handed (or "RH") slotted helix cylinder 335, both disposed within an outer casing 325. The RH slotted helix cylinder 335 is disposed within the LH slotted helix cylinder 330. A stationary shaft 340 is disposed through a longitudinal hole formed through the RH slotted helix cylinder 335 and protrudes from two ends of the RH slotted helix cylinder 335. An annular carrier 77 is disposed around a portion of the stationary shaft 340 extending beyond an end of the RH slotted cylinder 335. A bearing 375 is disposed around another portion of the stationary shaft 340 protruding beyond another end of the RH slotted cylinder 335. The bearing 375 has an annular portion disposed in contact with an inner surface of the LH slotted cylinder 330. A roller clutch 345 has an outer surface disposed in contact with the inner surface of the LH slotted helix cylinder 330. The roller clutch 345 is disposed around the carrier 377. A bearing 375 is disposed around the stationary shaft 340 near an end of the RH slotted helix cylinder 335 further from the output gear 320 and contacts an inner surface of the RH slotted helix cylinder 335. A roller clutch 345 is disposed around the stationary shaft 340 near another end of the RH slotted helix cylinder 335 closer to the output gear 320 and contacts an inner surface of the RH slotted helix cylinder 335. An input device comprises a cylindrically-shaped sleeve 350 having a hole formed in a longitudinal direction. The stationary shaft 340 is disposed through the hole formed in the sleeve 350, such that the sleeve 350 is slidable disposed along the stationary shaft 340. An input shaft 355 of the input device extends from an outside surface of the sleeve 350 such that the input shaft 355 is disposed at an angle substantially perpendicular to the stationary shaft 340 and passes through a slot 365 formed in the outer casing 325 and extends in a lengthwise direction along a length of the outer casing 325. A shaft roller 357 is disposed on the input shaft 355 such that the shaft roller 357 is slidable disposed in contact with the RH slotted helix cylinder 335, Another shaft roller 357 is disposed on the input shaft 355 such that the shaft roller is slidable disposed in contact with the LH slotted helix cylinder 330. An output sleeve 379, with two ends, has one end disposed through an opening in a central portion of a bearing 375 which is attached to a central portion of an output gear 320. The output sleeve 379 extends from the end near the output gear 320 through a central portion of the roller clutch 345 disposed within a central portion of the carrier 377.

Moving the input shaft 355 in a direction toward output gear 320 causes the LH slotted helix cylinder 330 to rotate in a clockwise direction, when viewed from an end of the helical drive having the output gear 320, and causes the RH slotted helix cylinder 335 to rotate in a counterclockwise direction. Moving the input shaft 355 in a direction away from the output gear 320 causes the LH slotted helix cylinder 330 to rotate in a counterclockwise direction and the RH slotted helix cylinder 335 to rotate in a clockwise direction. When either the LH slotted helix cylinder 330 or the RH slotted helix cylinder 335 is rotated in the clockwise direction, the respective roller clutch 345 causes the output sleeve 379 to rotate in the clockwise direction. When the output sleeve 379 rotates in the clockwise direction, the outer rim of the output gear 320 rotates in the clockwise direction.

What is claimed is:

1. An apparatus comprising:
   a. a wheelchair including a plurality of wheels; and
   b. at least one driving mechanism, attached to the wheelchair, adapted to rotate one of the wheels of the wheelchair, wherein:
      i. the driving mechanism is capable of receiving a linearly directed force on a single plane to drive the wheelchair with a constant torque;
      wherein the driving mechanism includes a helical drive shaft having a longitudinal axis, said driving mechanism being capable of receiving said linearly directed force in a direction parallel to said longitudinal axis of said helical drive shaft; and
      wherein the driving mechanism further includes one of a slider and a sleeve slidably disposed along an exterior of said helical drive shaft.

2. The apparatus according to claim 1, wherein:
   a. the helical drive shaft is disposed near a side of a corresponding wheel of the wheelchair facing away from the wheelchair such that the corresponding wheel is disposed between the helical drive and a frame of the wheelchair.

3. The apparatus according to claim 1, wherein:
   a. the helical drive shaft is disposed between a corresponding wheel and a frame of the wheelchair.

4. The apparatus as in claim 1, wherein:
   a. at least one wheel of the wheelchair includes a gear extending from a center of the wheel;
   b. the helical drive shaft includes a gear extending from an end of the helical drive shaft; and
   c. the gear extending from the wheel engages the gear extending from the end of the helical drive shaft.

5. The apparatus as in claim 4, wherein:
a. the gear extending from the wheel is a crown gear; and
b. the gear extending from the helical drive shaft is a pinion gear.

6. The apparatus according to claim 1, further comprising:
a. a linkage, wherein:
   i. at least one wheel of the wheelchair includes a gear extending from a center of the wheel,
   ii. the helical drive includes a gear extending from an end of the helical drive, and
   iii. the linkage links the gear extending from the wheel to the gear extending from the end of the helical drive such that rotation of the gear extending from the helical drive causes rotation of the gear extending from the wheel.

7. The apparatus according to claim 6, wherein:
a. the linkage comprises one of a chain, a drive shaft, and a rubber belt linking the gear extending from the helical drive with the gear extending from the wheel.

8. The apparatus according to claim 1, further comprising:
a. a gear having an axle disposed therethrough, two ends of the axle are each disposed within a center of one of the wheels of the wheelchair and the axle is attached to the wheelchair, wherein:
b. the helical drive includes a gear extending from an end of the helical drive, and
c. the gear at the end of the helical drive engages the gear having the axle disposed therethrough.

9. The apparatus comprising:
a. a wheelchair having a plurality of wheels;
b. two helical drives disposed parallel to each other and adapted to rotate at least one of the wheels of the wheelchair:
c. each of the two helical drives comprising:
   i. a helical drive shaft, one end of the helical drive shaft being disposed within a roller clutch, wherein the helical drive shaft is a twisted flat bar,
   ii. a slider slidably disposed on the helical drive shaft such that a hand-initiated, linearly directed sliding motion of the slider on a single plane causes the helical drive shaft to rotate, wherein the slider forms a thin rectangular opening having the twisted flat bar disposed therethrough,
   iii. a first gear communicating with the roller clutch, and
   iv. a second gear disposed approximately perpendicular to the first gear and engaging the first gear,
d. an axle disposed through an opening formed in each of the second gear such that rotation of the second gear causes rotation of the axle; and
e. a wheel of the wheelchair is attached to each of two ends of the axle, and the axle is attached to the wheelchair.

10. An apparatus comprising:
a. a wheelchair including a plurality of wheels: and
b. at least one driving mechanism, attached to the wheelchair, adapted to rotate one of the wheels of the wheelchair, wherein:
   i. the driving mechanism drives the wheelchair with a constant torque;
   ii. the driving mechanism includes a helical drive; the helical drive comprising:
      a helical drive shaft including a twisted flat bar, one end of the helical drive shaft being disposed within a mounting bracket, another end of the helical drive shaft being disposed within a roller clutch;
      a slider slidably disposed on the helical drive shaft such that a hand-initiated, linearly directed sliding motion of the slider on a single plane causes the helical drive shaft to rotate;
      a first gear connected to the roller clutch by a rod extending from a side of the roller clutch facing away from the helical drive shaft, the first gear being for engaging a second gear.

11. The apparatus according to claim 10, wherein:
a. the slider forms a thin rectangular opening, and
b. the twisted flat bar is disposed through the thin rectangular opening.

12. The apparatus according to claim 10, wherein:
a. the fist gear comprises a pinion gear, and
b. the second gear comprises a crown gear.

13. An apparatus comprising:
a. a wheelchair having a plurality of wheels;
b. two helical drives disposed parallel to each other and adapted to rotate at least one of the wheels of the wheelchair;
c. each of the two helical drives comprising:
   i. a helical drive shaft, one end of the helical drive shaft being disposed within a roller clutch;
   ii. a slider slidably disposed on the helical drive shaft such that a hand-initiated, linearly directed sliding motion of the slider on a single plane parallel to a longitudinal axis of the helical drive shaft causes the drive shaft to rotate; and
   iii. a first gear communicating with the roller clutch;
d. a second gear disposed between the first gear of each of the helical drives and being approximately perpendicular thereto and engaging each of the first gear;
e. an axle disposed through an opening formed in the second gear such that rotation of the second gear causes rotation of the axle; and
f. a wheel of the wheel chair being attached to each of two ends of the axle, and the axle is attached to the wheelchair.

14. An apparatus comprising:
a. a wheelchair having a plurality of wheels;
b. two helical drives disposed parallel to each other and adapted to rotate at least one of the wheels of the wheelchair;
c. each of the two helical drives comprising:
   i. a helical drive shaft, one end of the helical drive shaft being disposed within a roller clutch,
   ii. a slider slidably disposed on the helical drive shaft such that a sliding motion of the slider causes the drive shaft to rotate,
   iii. a first gear communicating with the roller clutch,
   iv. a mounting bracket having another end of the helical drive shaft disposed therethrough,
   v. an output gear connected to the other end of the helical drive shaft having a rod disposed through a center of the output gear, the rod extending from the other end of the helical drive shaft and through the mounting bracket, and
   vi. a synchronizing gear disposed between each of the output gears, wherein:
      (1) a rod is disposed through an opening formed in the synchronizing gear,
      (2) a cable is attached to an end of the rod disposed through the synchronizing gear, and
      (3) a spring member is disposed on the rod which is disposed through the opening formed in the synchronizing gear;

d. a second gear disposed between the first gear of each of the helical drives and being approximately perpendicular thereto and engaging each of the first gear:

e. an axle disposed through an opening formed in the second gear such that rotation of the second gear causes rotation of the axle; and f. a wheel of the wheel chair is attached to each of two ends of the axle.

15. The apparatus according to 14, wherein:

a. the helical drive shaft is a twisted flat bar; and b. the slider forms a thin rectangular opening having the twisted flat bar disposed therethrough.

16. The apparatus comprising:

a. a wheelchair having a plurality of wheels;

b. two helical drives disposed parallel to each other and adapted to rotate at least one of the wheels of the wheelchair;

c. each of the two helical drives comprising:
 i. a helical drive shaft, one end of the helical drive shaft being disposed within a roller clutch,
 ii. a slider slidably disposed on the helical drive shaft such that a hand-initiated, linearly directed sliding motion of the slider on a single plane parallel to a longitudinal axis of the helical drive shaft causes the drive shaft to rotate,
 iii. a first gear communicating with the roller clutch, and
 iv. a second gear disposed approximately perpendicular to the first gear and engaging the first gear;

d. an axle disposed through an opening formed in each of the second gear such that rotation of the second gear causes rotation of the axle; and e. a wheel of the wheelchair is attached to each of two ends of the axle, and the axle is attached to the wheelchair.

17. Add-on components for a wheelchair comprising:

a. a helical driving mechanism capable of receiving a linearly directed force on a single plane and parallel to a longitudinal axis of said helical driving mechanism to thereby rotate at least one wheel of the wheelchair;
 wherein the driving mechanism includes a helical drive shaft having a longitudinal axis, said driving mechanism being capable of receiving said linearly directed force in a direction parallel to said longitudinal axis of said helical drive shaft; and
 wherein the driving mechanism further includes one of a slider and a sleeve slidably disposed along an exterior of said helical drive shaft.

18. The add-on components according to claim 17, further comprising:

a. a linkage to link a gear, extending from an end of the helical drive, to a gear for rotating a wheel of the wheelchair.

19. The add-on components according to claim 18, wherein:

a. the linkage comprises one of a chain, a drive shaft, and a rubber belt.

20. Add-on components for a wheelchair comprising:

a. a helical drive adapted to rotate at least one wheel of the wheelchair, the helical drive comprising:
 i. a helical drive shaft including a twisted flat bar;
 ii. a slider slidably disposed on the helical drive shaft such that a sliding motion of the slider causes the helical drive shaft to rotate; and
 iii. a first gear communicating with a roller clutch disposed on an end of the helical drive shaft.

21. The add-on components according to claim 20, wherein:

a. the slider forms an opening having the twisted flat bar disposed therethrough.

* * * * *